Dec. 4, 1945.  A. S. KELECIUS  2,390,307
GAS POWERED MODEL AIRPLANE CONTROL LINE APPARATUS
Filed Feb. 22, 1944  3 Sheets-Sheet 1

INVENTOR.
ANTHONY S. KELECIUS
BY
A. B. Bowman
ATTORNEY

Dec. 4, 1945.     A. S. KELECIUS     2,390,307
GAS POWERED MODEL AIRPLANE CONTROL LINE APPARATUS
Filed Feb. 22, 1944      3 Sheets-Sheet 2
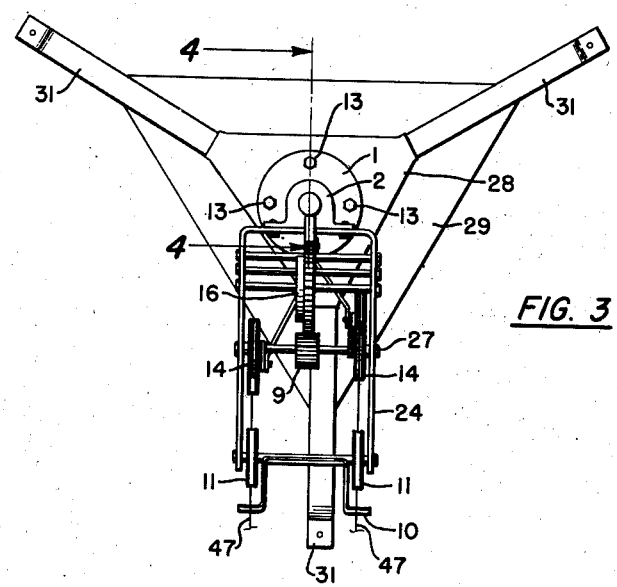
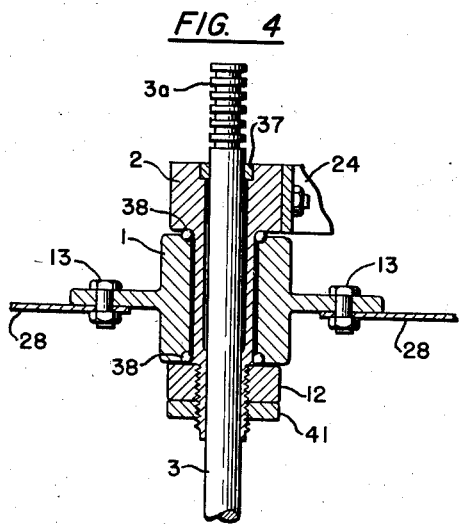
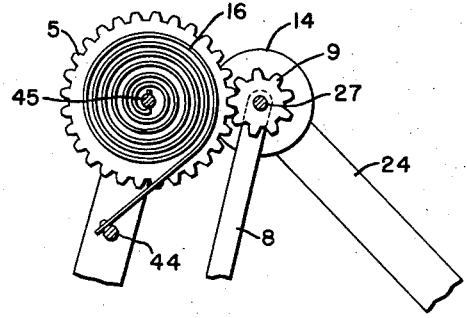
INVENTOR.
ANTHONY S. KELECIUS
BY
A. B. Bowman
ATTORNEY Dec. 4, 1945.    A. S. KELECIUS    2,390,307
GAS POWERED MODEL AIRPLANE CONTROL LINE APPARATUS
Filed Feb. 22, 1944    3 Sheets-Sheet 3
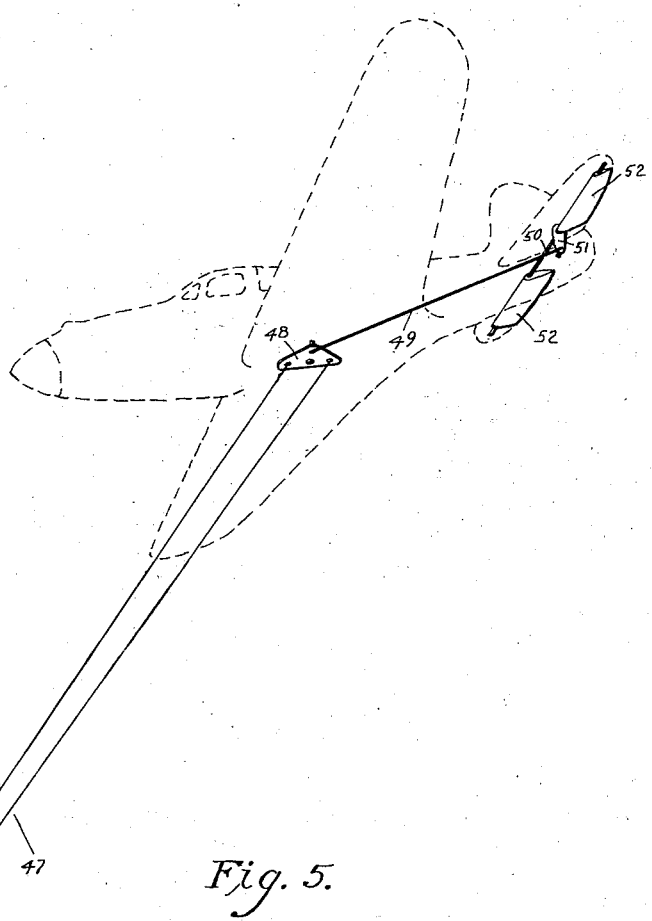
Fig. 5.
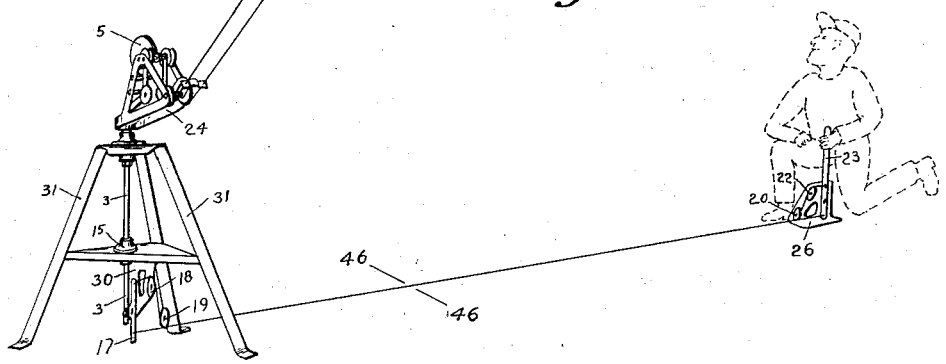
Witnesses:
John C. Lane
Louise Miklovic
INVENTOR
BY Anthony S. Kelecius
ATTORNEY Patented Dec. 4, 1945

2,390,307

UNITED STATES PATENT OFFICE 2,390,307

GAS POWERED MODEL AIRPLANE CONTROL LINE APPARATUS

Anthony S. Kelecius, Oaklawn, Ill.

Application February 22, 1944, Serial No. 523,390

7 Claims. (Cl. 272—31)

My invention relates to a model airplane control tower, more particularly for use in remote control of flying model airplanes and the objects of my invention are:

First, to provide a control tower of this class which affords the operator control of the airplane while positioned on the outside of the flying circle of said airplane;

Second, to provide a control tower of this class having means which automatically absorbs slack in the control line caused by wind or other flight disturbances;

Third, to provide a control tower of this class which reduces area requirements for the performance of indoor flying events;

Fourth, to provide a novel control tower of this class; and

Fifth, to provide a control tower of this class which is very simple and economical of construction, efficient in its action and which will not readily deteriorate or get out of order.

Figure 1:
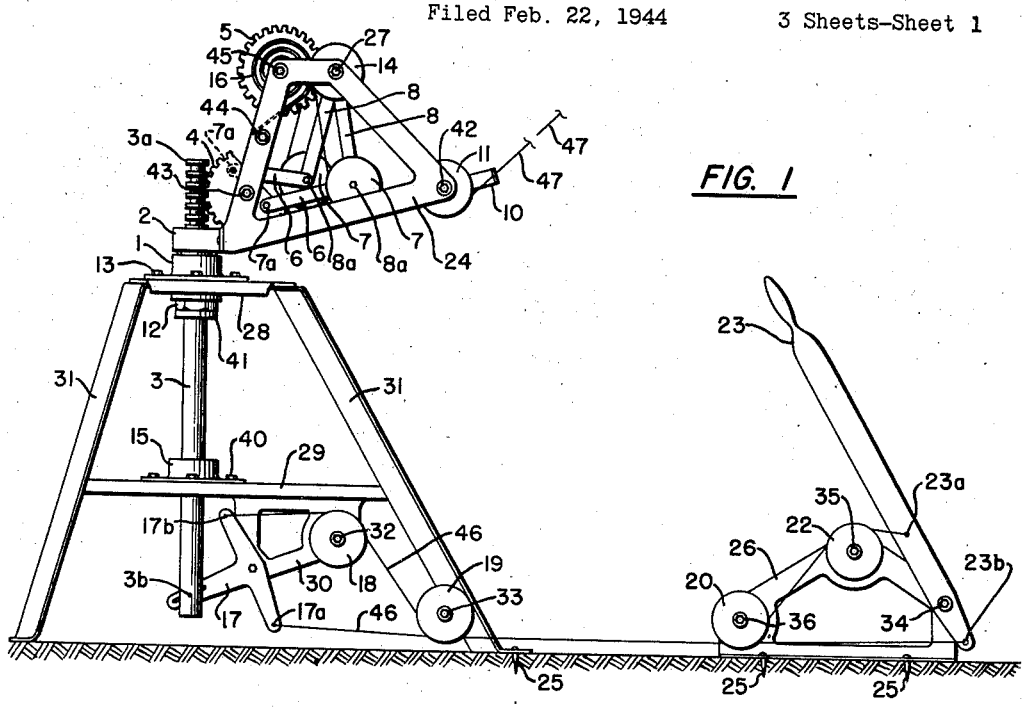
Figure 2:
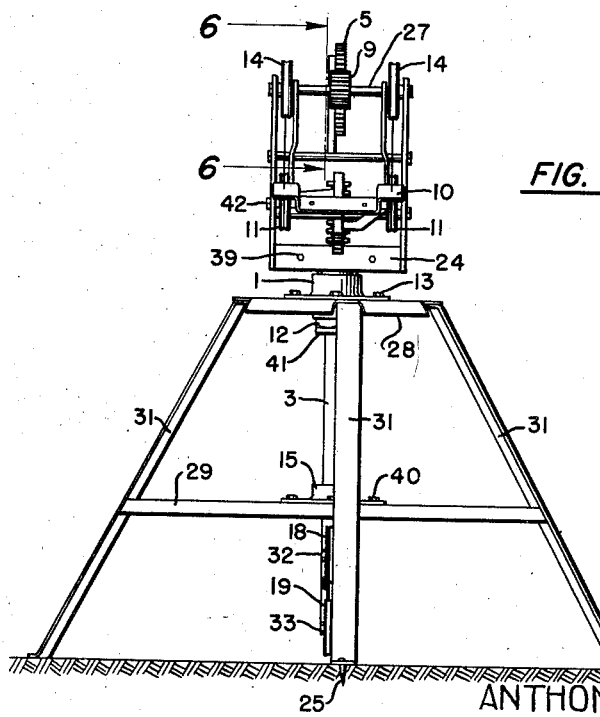

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side elevational view of the model airplane control tower; Fig. 2 is an elevational view taken on a plane ninety degrees to that as shown in Fig. 1; Fig. 3 is a top or plan view thereof; Fig. 4 is an enlarged fragmentary sectional view taken from the line 4—4 of Fig. 3; Fig. 5 is a perspective view of the model airplane control tower showing the model airplane in flight controlled thereby and also showing the operator at the control; and Fig. 6 is an enlarged sectional view taken from the line 6—6 of Fig. 2.

Similar characters of reference refer to similar parts and portions throughout the several views of the drawings:

The bearing housing 1, shaft 2, rod 3, gear segments 4, gear 5, levers 6, pulleys 7, levers 8, pinions 9, fairleads 10, pulleys 11, adjusting nut 12, bolts 13, reels 14, bearing 15, spring 16, bellcrank 17, pulleys 18, 19, 20 and 22, control handle 23, control frame 24, spikes 25, control frame 26, shaft 27, platform 28, frame member 29, bracket 30, tripod legs 31, shafts 32, 33, 34, 35 and 36, bushings 37, ball bearings 38, bolts 39 and 40, nut 41, shafts 42, 43, 44 and 45, cables 46 and 47, bellcrank 48, rod 49, shaft 50, horn 51 and the elevators 52 constitute the principal parts and portions of my model airplane control tower.

The tripod legs 31 support the platform 28 and the frame member 29 which supports the bearing housing 1 and the bearings 15 as shown best in Fig. 1 of the drawings. As shown in Fig. 4 of the drawings the bearing housing 1 supports the shaft 2 by means of the ball bearings 38 and the adjusting nut 12 and lock nut 41. The shaft 2 is thus free to rotate in connection with the bearing housing 1 on the ball bearings 38.

The rod 3 is reciprocably mounted in the shaft 2 in the bushing 37 and in the bearing 15, as shown best in Figs. 1 and 4 of the drawings. Rigidly connected to the shaft 2 are the control frames 24 which are arranged in spaced relation to each other as shown best in Fig. 2 of the drawings. Interconnecting these control frames 24 are the shafts 27, 42, 43, 44 and 45. The gear segment 4 is pivotally mounted on the shaft 43 and meshes with the annular teeth 3a of the rod 3, as shown best in Fig. 1 of the drawings. Pivotally connected to the gear segment 4 on the pin 7a are the levers 6. These levers 6 are pivotally connected to the levers 8 by means of the pins 8a. Rotatably mounted on these pins 8a are the pulleys 7. The opposite ends of the levers 8 are pivotally mounted on the shaft 27 at opposite sides of the pinions 9. Secured on the shaft 27 are the reels 14 and the pinion 9 which meshes with the gear 5 on the shaft 45. The coil spring 16 is secured at its one end to the gear 5 and at its other end to the shaft 44. This coil spring 16 tends to turn the gear 5 and rotate the shaft 27 together with the pinion 9 and the reels 14. The pulleys 11 are rotatably mounted on the shaft 42 interconnecting the control frame 24 and the fairleads 10 extend outwardly from the pulleys 11 and operate as guides for the cables 47 passing over the lower side of the pulleys 11, all as shown best in Fig. 1 of the drawings. The cables 47 are each secured to one of the reels 14 and pass over one of the pulleys 7 and one of the pulleys 11, as shown in Fig. 1 of the drawings and extend upwardly to the airplane and are connected to opposite ends of the bellcrank 48 which is pivotally mounted on the airplane. The rod 49 interconnects the bellcrank 48 and the horn 51 on the shaft 50 for pivoting the elevators 52, as shown best in Fig. 5 of the drawings.

Connected with the lower end of the rod 3 is a thrust bearing 3b engaged by the bellcrank 17 which is pivotally mounted on the bolt 21 on the bracket 30, as shown best in Fig. 1 of the drawings. The pulley 18 is also rotatably mounted on the bracket 30 by means of the shaft 32. The pulley 19 is rotatably mounted in connection with one of the tripod legs 31 by means of the shaft 33. The control handle 23 is provided with cable connections 23a and 23b with which the cables 46 are connected. One of the cables 46 passes over the pulleys 20 and 22 and the pulley 19 as shown in Fig. 1 of the drawings, while the other cable 46 passes from the connection 23b directly to the arm 17a of the bellcrank member 17. The arm 17b of the bellcrank member 17 is connected to the other control cable 46 which passes over the pulley 18 and the pulley 19. The control frame 26 supports the pulleys 20 and 22 which are securely connected therewith on shafts 35 and 36 and the control handle 23 is pivotally mounted on the shaft 34 in connection with said control frame 26.

The operation of my model airplane control tower is substantially as follows: The model airplane, as shown in Fig. 5 of the drawings is connected to the control cables 47 and positions the control handle 23 in the desired position relatively to the tripod legs 31 and the control cables 46 extend to the bellcrank member 17. The model airplane is started in flight and it travels in a circle around the axis of the rod 3 whereby the control frames 24 secured to the shaft 2 rotate about the axis of the rod 3 on the ball bearing 38. The airplane in connection with the control cable 47 pulls the control frame 24 around the axis of the rod 3. When it is desired to operate the elevators of the model airplane the operator forces the control handle 23 in one direction which moves the rod 3 reciprocally in the shaft 2 and the bearing 15 imparting rotation to the gear segment 4 shifting the levers 6 and 8 together with the pulleys 7 over which the control cables 47 pass.

It will be noted that the pulleys 7 shift in opposite direction whereby one of the control cables 47 is retracted while the other is slacked off whereby the bellcrank 48 in connection with the airplane is pivoted on the pin 48a. The up or down pivotal control of the elevators is determined by the forward or backward movement of the control lever 23 and flight disturbances such as wind or the like are compensated for by the tension imparted to the cables by the coil spring 16.

Assuming that the model airplane is blown slightly out of its course and the control cables are extended by rotation of the reels 14 together with the pinion 9 which winds the coil spring 16 in connection with the gear 5. Following such a flight disturbance the slack in the control cables 47 is taken up by the tension in the coil 16 which imparts movement to the gear 5 rotating the pinion 9 and winding the control cables 47 on the reels 14. In this manner of control flexibility is provided to compensate for wind which disturbs the normal flight of the model airplane automatically caring for this control without attention of the operator.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I I claim as new and desire to secure by Letters Patent is:

1. In a model airplane control tower of the class described the combination of a control handle, a bellcrank member pivotally connected to the model airplane, control cables extending from said bellcrank member, reels with which said control cables are connected, and pulleys over which said control cables pass individually pivoted about the axis of said reels, said pulleys operatively connected to said control handle.

2. In a model airplane control tower of the class described the combination of a control handle, a bellcrank member pivotally connected to the model airplane, control cables extending from said bellcrank member, reels with which said control cables are connected, and pulleys over which said control cables pass individually pivoted about the axis of said reels, said pulleys operatively connected to said control handle, a pivotally mounted gear segment having opposed pivotal connections operatively connected to said pulleys and a vertically disposed reciprocally mounted rod having annular teeth in mesh with said gear segment operatively connected with said control handle.

3. In a model airplane control tower of the class described the combination of a control handle, a bellcrank member pivotally connected to the model airplane, control cables extending from said bellcrank member, reels with which said control cables are connected, and pulleys over which said control cables pass individually pivoted about the axis of said reels, said pulleys operatively connected to said control handle, a pivotally mounted gear segment having opposed pivotal connections operatively connected to said pulleys and a vertically disposed reciprocally mounted rod having annular teeth in mesh with said gear segment operatively connected with said control handle, bellcrank means in connection with said rod, and secondary control cables interconnecting said bellcrank means and said control handle.

4. In a model airplane control tower of the class described the combination of a vertically disposed reciprocally mounted rod, a bellcrank arranged to reciprocally operate said rod, a control handle remotely disposed from said rod, and control cables interconnecting said control handle and said bellcrank member, a second bellcrank member in connection with a model airplane and pivotally mounted thereon, second control cables extending from said second bellcrank member, reels rotatably mounted about the axis of said rod on which said second control cables are secured, and pulleys over which said second control cables pass pivotally mounted about the axis of said reels and operatively pivotal in connection with said rod.

5. In a model airplane control tower of the class described the combination of a vertically disposed reciprocally mounted rod, a bellcrank arranged to reciprocally operate said rod, a control handle remotely disposed from said rod, and control cables interconnecting said control handle and said bellcrank member, a second bellcrank member in connection with a model airplane and pivotally mounted thereon, second control cables extending from said second bellcrank member, reels rotatably mounted about the axis of said rod on which said second control cables are secured, and pulleys over which said second control cables pass pivotally mounted about the axis of said reels and operatively pivotal in connection with said rod, a pivotally mounted gear segment having opposed pivotal connections operatively connected to said pulleys and rotatable with the reciprocal movement of said rod.

6. In a model airplane control tower of the class described the combination of a vertically disposed reciprocally mounted rod, a bellcrank arranged to reciprocally operate said rod, a control handle remotely disposed from said rod, and control cables interconnecting said control handle and said bellcrank member, a second bellcrank member in connection with a model airplane and pivotally mounted thereon, second control cables extending from said second bellcrank member, reels rotatably mounted about the axis of said rod on which said second control cables are secured, and pulleys over which said second control cables pass pivotally mounted about the axis of said reels and operatively pivotal in connection with said rod, a pivotally mounted gear segment having opposed pivotal connections operatively connected to said pulleys and rotatable with the reciprocal movement of said rod, a coil spring tending to rotate said reels and imparting tension on said second control cables.

7. In a model airplane control tower of the class described the combination of a vertically disposed reciprocally mounted rod, a bellcrank arranged to reciprocally operate said rod, a control handle remotely disposed from said rod, and control cables interconnecting said control handle and said bellcrank member, a second bellcrank member in connection with a model airplane and pivotally mounted thereon, second control cables extending from said second bellcrank member, reels rotatably mounted about the axis of said rod on which said second control cables are secured, and pulleys over which said second control cables pass pivotally mounted about the axis of said reels and operatively pivotal in connection with said rod, a pivotally mounted gear segment having opposed pivotal connections operatively connected to said pulleys and rotatable with the reciprocal movement of said rod, a coil spring tending to rotate said reels and imparting tension on said second control cables, reduction gearing in connection with said coil spring arranged to rotate said reels several revolutions.

ANTHONY S. KELECIUS.